(No Model.) 4 Sheets—Sheet 1.

C. N. BINTCLIFFE.
MACHINE FOR APPLYING ADHESIVE MATERIAL TO ENVELOPS.

No. 597,453. Patented Jan. 18, 1898.

WITNESSES
Fred White
Thomas F. Wallace

INVENTOR:
Caroline Newman Bintcliffe,
By her Attorneys:
Arthur E. Fraser & Co.

(No Model.) 4 Sheets—Sheet 3.
C. N. BINTCLIFFE.
MACHINE FOR APPLYING ADHESIVE MATERIAL TO ENVELOPS.
No. 597,453. Patented Jan. 18, 1898.

WITNESSES: Fred White, Thomas F. Wallace

INVENTOR: Caroline Newman Bintcliffe,
By her Attorneys (No Model.) 4 Sheets—Sheet 4.
C. N. BINTCLIFFE.
MACHINE FOR APPLYING ADHESIVE MATERIAL TO ENVELOPS.
No. 597,453. Patented Jan. 18, 1898.

WITNESSES: Fred White, Thomas F. Wallace

INVENTOR Caroline Newman Bintcliffe
By her Attorneys Arthur C. Fraser

United States Patent Office.

CAROLINE NEWMAN BINTCLIFFE, OF LONDON, ENGLAND, ASSIGNOR OF ONE-HALF TO JOHN WALKER, OF SAME PLACE.

MACHINE FOR APPLYING ADHESIVE MATERIAL TO ENVELOPS.

SPECIFICATION forming part of Letters Patent No. 597,453, dated January 18, 1898.

Application filed September 15, 1896. Serial No. 605,852. (No model.)

*To all whom it may concern:*

Be it known that I, CAROLINE NEWMAN BINTCLIFFE, of London, England, have invented certain new and useful Improvements in Machines for Applying Adhesive Material to Envelops and other Articles of Stationery, of which the following is a specification.

This invention relates to machines for applying adhesive material (hereinafter spoken of as "gum") to envelops and other articles of stationery, and is more particularly intended for applying gum to already-folded envelops in such manner that it can be applied to any desired part of same. The special object of the invention, however, is to apply the gum to the body of the folded envelop in such a position that the closing-flap, ungummed and merely moistened, will when folded down come upon the gummed part and adhere thereto.

The invention comprises a gum vessel with an elongated outlet at bottom provided with lips between which the gum passes, one or both said lips being lined or covered with felt or similar material, and the said vessel being movable down and up and forward and backward, so that it can be first moved down to bring the felt upon the envelop, then forward to spread gum over the desired part of the envelop, and then upward and backward to its first position.

The invention also comprises means or devices for regulating or stopping the flow of the gum and other improvements which will be understood from the following description of the construction and operation of a machine in which the invention is embodied and from the accompanying drawings.

Figure 1:
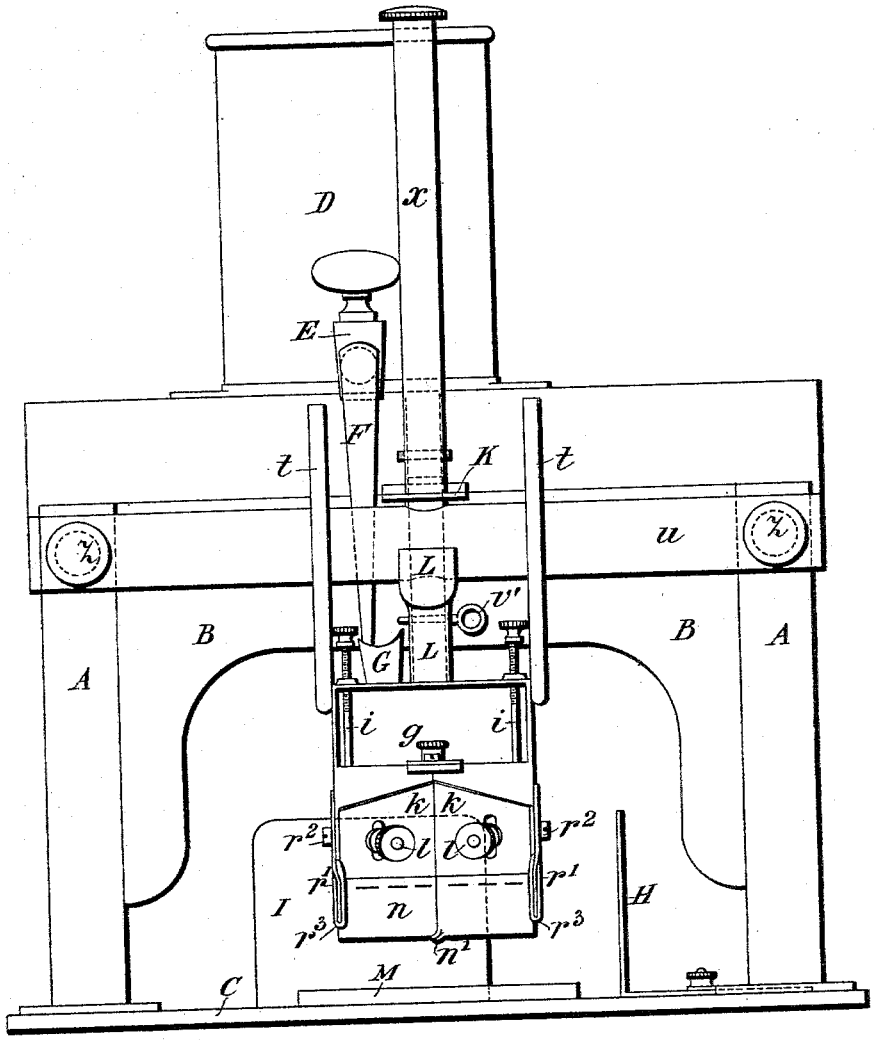
Figure 2:
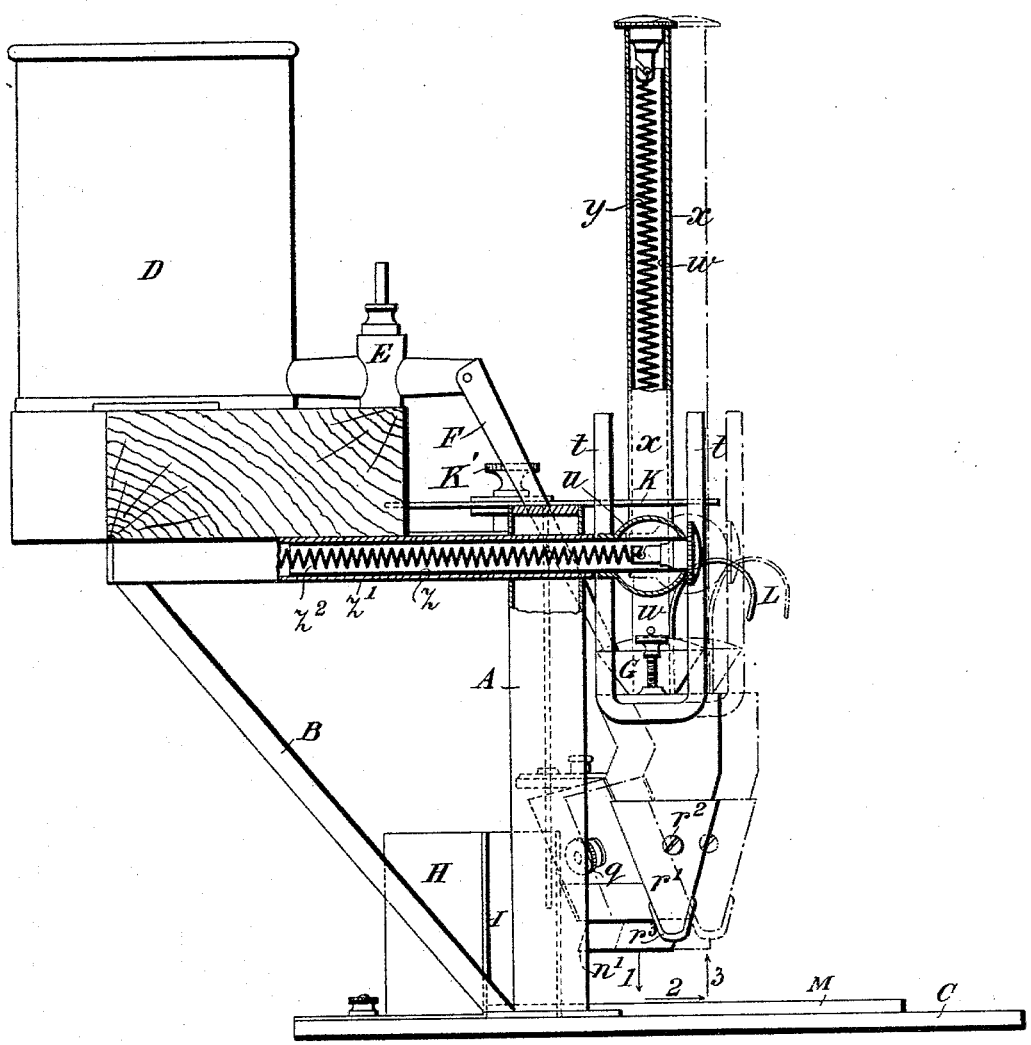
Figure 3:
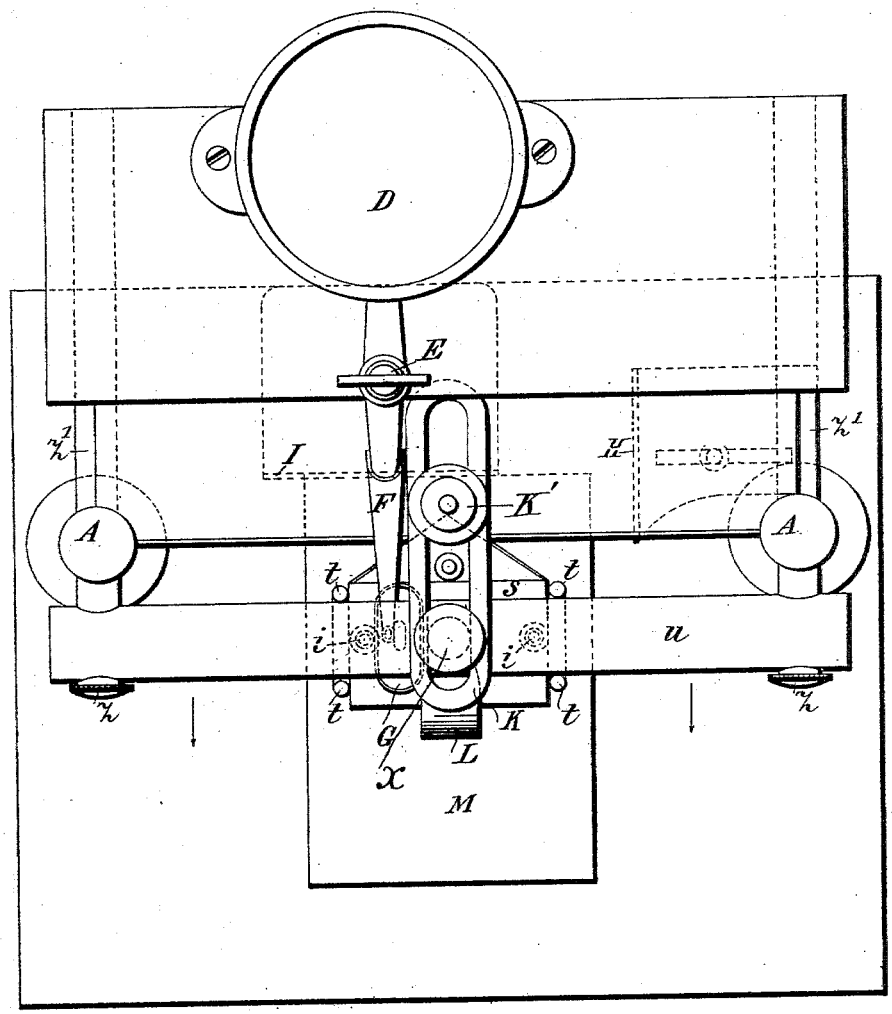
Figure 4:
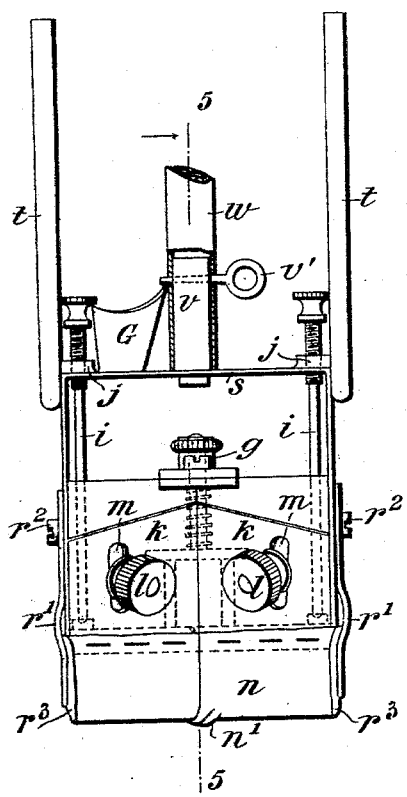
Figure 5:
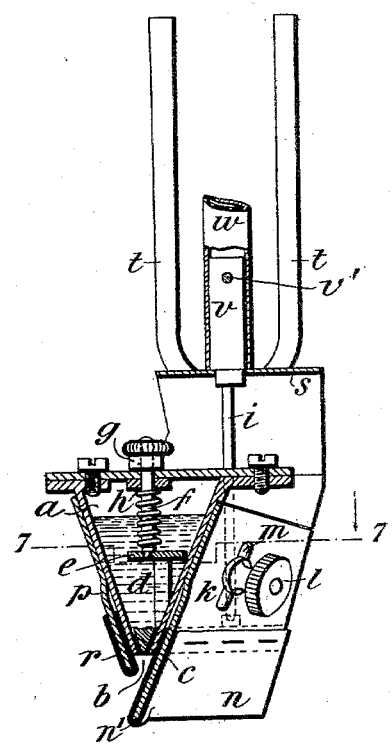
Figure 6:
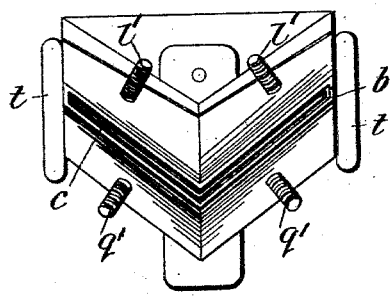
Figure 7:
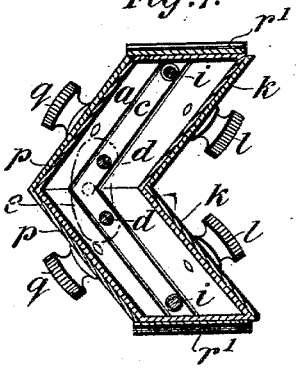

In the said drawings, Figure 1 is a front elevation of the machine. Fig. 2 is a side elevation with the vertical telescopic tube and one of the horizontal telescopic tubes partly in section. Fig. 3 is a plan of the machine. Fig. 4 is a front elevation of the gum vessel and adjoining parts on a larger scale. Fig. 5 is a section on the line 5 5 of Fig. 4. Fig. 6 is a view of the under side of the gum vessel. Fig. 7 is a section on the line 7 7 of Fig. 5.

$a$ is the gum vessel. It is somewhat V-shaped in plan, as seen in Fig. 7, so that its outlet may correspond approximately with the outline of the portion of the surface of the envelop which is required to be gummed.

$b$ is the outlet at the bottom of the vessel $a$.

$c$ is an adjustable wedge for regulating or controlling the flow of the gum through the outlet $b$. This wedge is carried by two rods $d\ d$, depending from a plate $e$. From this plate $e$ a rod $f$ extends upward and is screw-threaded to receive a nut $g$. Around the rod $f$ is a spring $h$, tending to force the plate $e$, and consequently the wedge $c$, downward. The pressure can be regulated by more or less screwing up the nut $g$.

$i\ i$ are two rods bearing at their lower ends against the wedge $c$ near its respective ends. These rods are screw-threaded and work in nuts $j\ j$, and they serve to adjust the flow of the gum should it be found to pass out of the vessel $a$ more freely at one end of the outlet $b$ than at the other.

$k\ k$ is a front plate attached by nuts $l\ l$, screwing on threaded stubs $l'\ l'$, Fig. 6, to the front of the vessel $a$, the height being adjustable by means of the slots $m\ m$. The lower part of the plate $k$ is covered with felt or similar material $n$ and constitutes the front lip of the outlet of the vessel $a$.

$p\ p$ is a back plate attached by nuts $q\ q$, screwing on threaded stubs $q'\ q'$, Fig. 6, to the back of the vessel $a$. It is likewise covered at its lower part with felt or similar material $r$ and constitutes the back lip, the function of which is to direct the gum onto the front lip $n$.

$r'\ r'$ are end plates secured by screws $r^2$ and serving to hold small pieces of felt $r^3$, which prevent the gum leaking at the ends of the vessel $a$. The vessel $a$ is carried by a frame $s$, having guide-forks $t\ t$, embracing a horizontal tube $u$. The frame $s$ has also a vertical piece $v$, which is connected by a pin $v'$ to the lower end of a tube $w$, fitted within an outer tube $x$ and provided with a spring $y$, which tends to draw it upward. To the ends of the tube $u$ are connected two horizontal tubes $z\ z$, sliding in tubes $z'\ z'$ and having springs $z^2$, which tend to draw them backward.

The parts hereinbefore described are supported by pillars A A and brackets B from a work-table or base-plate C.

D is a gum-reservoir with outlet fitted with a tap E, having a removable spout F, leading to a funnel G, for supplying the vessel $a$.

H is an adjustable side gage for the envelops to be gummed, and I an adjustable back gage.

K is an adjustable gage to regulate the forward movement of the gum vessel $a$. In its slot works the upright $x$, which is stopped by striking the end of the slot, and by means of a set-screw K' the gage may be adjusted to vary the effective length of its slot. Any suitable arrangement may be employed to give the down and up and forward and backward movements to the vessel $a$. The drawings show a handle or finger-piece L by which these movements can be given manually.

M represents a pad on the base-plate C, upon which the envelops are laid during the gumming operation.

The operation is as follows: The vessel $a$ having been supplied with gum and the wedge $c$ having been adjusted the gum flows slowly through the outlet $b$, saturates the felts $n$ and $r$ of the lips $k$ and $p$, and keeps them in a state of saturation. The gages H and I are adjusted to suit the dimensions of the envelops to be gummed. The envelops are placed either one at a time or a number together upon the pad M with their side edge against the gage H and their bottom edge against the gage I. The vessel $a$ is then moved down by means of the handle L to bring the felt $n$ upon the envelop or topmost envelop, as indicated by the arrow 1 in Fig. 2. The vessel $a$ is then moved forward by means of the handle L, as indicated by the arrow 2 in Fig. 2, and as in this movement the felt $n$ is in contact with the envelop it spreads gum thereon. The vessel $a$ is then moved upward, as indicated by the arrow 3, by means of the handle L, assisted by the spring $y$, which had become distended during the downward movement, and finally the vessel $a$ is moved backward to its original position by means of the handle L, assisted by the springs $z^2$, which had become distended during the forward movement. The gummed envelop is then removed. The position of the parts after the upward movement, but before the backward movement, is indicated by dots in Fig. 2. The employment of the springs $y$ and $z^2$ is not essential, as the movements can be effected entirely by means of the handle L. In the downward and upward movements of the vessel it is guided by the tube $w$, sliding in the tube $x$, and by the forks $t\ t$, embracing and sliding against the tube $u$, by which the vessel is prevented from swinging on the axis of the tube $x$, and the vessel is drawn upwardly by the spring $y$. In the forward and backward movements of the carrier or tube $u$ it is guided by its tubes $z$, sliding in the fixed tubes $z'$, and is drawn backward by the springs $z^2$. The flow of gum from the vessel $a$ is adjusted by raising or lowering the plate $c$. The felt-lipped plates $k$ and $p$ are also adjustable to vary the space between them through which the gum must flow and by one or both of which it is conducted to the envelop.

As in gumming the body of an envelop at the part where the closing-flap has to be secured the gum will have to be applied partly to where there is the thickness of three flaps, partly where there is the thickness of two flaps, and partly where there is the thickness of only one flap, it is desirable to leave the felt $n$ somewhat loose or with a sort of tongue at the middle or angular bend, as shown at $n'$.

What I claim, and desire to secure by Letters Patent, is—

1. In a gumming-machine, the combination of a work-table for supporting the article to be gummed, a gum vessel having a bottom outlet for discharging gum, a carrier for said vessel, slides for supporting said carrier, movable vertically and horizontally, and springs for lifting and drawing back said carrier, adapted to permit the vessel to be moved first downward upon the article, then horizontally along the latter to apply gum thereto, and then to be drawn upwardly and backwardly to its first position, substantially as and to the effect specified.

2. In a gumming-machine, the combination of a work-table for supporting the article to be gummed, a gum vessel having a bottom outlet for discharging gum, a carrier for said vessel, a vertical slide carrying it with a spring for lifting it, and a horizontal slide carrying said vertical slide with a spring for retracting it, all adapted to permit the vessel to be moved first downward upon the article, then horizontally along the latter to apply gum thereto, and then to be drawn upwardly and backwardly to its first position, substantially as and to the effect specified.

3. A gum vessel having opposite inclined sides and an elongated bottom outlet, and a lip of absorbent material beneath said outlet adapted to serve as a wiper to convey the gum oozing through said outlet onto said paper, said vessel mounted to be movable vertically and horizontally, an elongated wedge for regulating said outlet, and an adjustable connection between said wedge and the vessel by which while the wedge is normally stationary relatively to the vessel it may be adjusted to vary the flow from said outlet.

4. A gum vessel having opposite inclined sides and an elongated bottom outlet, said vessel mounted to be movable vertically and horizontally, an elongated wedge for regulating said outlet, and an adjustable connection between said wedge and the vessel by which while the wedge is normally stationary relatively to the vessel it may be adjusted to vary the flow from said outlet, the same comprising independent adjusting devices for the opposite ends of the wedge for regulating the flow if it is unequal at said ends.

5. A gum vessel $a$ having inclined sides and an elongated bottom outlet, combined with a wedge $c$ for regulating said outlet, an adjusting device engaging the middle of said wedge to raise or lower it, and additional independent adjustments for the opposite ends of the wedge, by means of which the flow of gum can be regulated if it passes more freely from one end of the outlet than the other.

6. A gum vessel having an elongated outlet and inclined sides sloping thereto, combined with exterior plates provided at their bottom edges with lips of yielding material, and relatively adjustable up or down to vary the space between said lips and thereby control the elongated outlet.

7. In a machine for gumming envelops or the like with an angular or V-shaped line of gum, the combination with a mounting therefor comprising vertical and horizontal slides, of a gum vessel formed with an angular elongated opening and sloping sides descending thereto, and provided with plates fastened against said sloping sides, and having lips of yielding absorbent material at their lower edges, said material on one of said plates being formed where the angular bend occurs with a loose portion or tongue, as specified.

8. The combination with the gum vessel $a$ having an outlet $b$, of the adjustable lip-plates $k$ and $p$, and end plates $r'$ $r'$ having felts $r^3$ $r^3$, to the effect specified.

In witness whereof I have hereunto signed my name in the presence of two subscribing witnesses.

CAROLINE NEWMAN BINTCLIFFE.

Witnesses:
 JOHN C. NEWBURN,
 THOMAS F. WALLACE.